(12) United States Patent
Lyon et al.

(10) Patent No.: US 11,140,063 B2
(45) Date of Patent: Oct. 5, 2021

(54) DYNAMIC SUBSCRIBER NETWORK PHYSICAL IMPAIRMENT DETECTION TECHNIQUES

(71) Applicant: ADTRAN, Inc., Huntsville, AL (US)

(72) Inventors: Jeremy Lyon, Huntsville, AL (US); Armand Nokbak Nyembe, Huntsville, AL (US); Ramya Raghavendra, Huntsville, AL (US); Arlynn W. Wilson, Huntsville, AL (US); Robert Barrett, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 65 days.

(21) Appl. No.: 16/659,066

(22) Filed: Oct. 21, 2019

(65) Prior Publication Data

US 2020/0274789 A1    Aug. 27, 2020

Related U.S. Application Data

(60) Provisional application No. 62/810,111, filed on Feb. 25, 2019.

(51) Int. Cl.
*H04L 12/26* (2006.01)
*G06N 7/00* (2006.01)
(Continued)

(52) U.S. Cl.
CPC .......... *H04L 43/50* (2013.01); *G06N 7/005* (2013.01); *G06N 20/20* (2019.01); *H04L 41/142* (2013.01)

(58) Field of Classification Search
CPC ....... H04L 43/50; H04L 41/142; G06N 20/20; G06N 7/005
(Continued)

(56) References Cited

U.S. PATENT DOCUMENTS

| 6,790,560 B2 | 9/2004 | Wakihara et al. |
| 2002/0067802 A1 | 6/2002 | Smith et al. |

(Continued)

FOREIGN PATENT DOCUMENTS

| EP | 1232636 | 6/2010 |
| EP | 2366235 | 2/2015 |

OTHER PUBLICATIONS

International Search Report and Written Opinion in International Appln. PCT/US2020/015604, dated Apr. 21, 2020, 15 pages.

*Primary Examiner* — Obaidul Huq
(74) *Attorney, Agent, or Firm* — Fish & Richardson P.C.

(57) ABSTRACT

Systems and techniques are disclosed for using machine learning to dynamically detect physical impairments in lines of a subscriber network. In some implementations, per-tone data for a line of a subscriber network and data indicating a set of one or more scores is obtained. Each score included in the set of scores indicates a conditional likelihood that the line has a type of impairment with respect to a different feature subset ensemble. The per-tone data and the data indicating the set of one or more scores is provided as input to a model. The model is trained to output, for each of different sets of feature subset ensembles, a confidence score representing an overall likelihood that a particular line has a physical impairment. Data indicating a particular confidence score representing an overall likelihood that the line has the physical impairment is obtained. The particular confidence score is provided for output.

17 Claims, 4 Drawing Sheets

(51) Int. Cl.
*G06N 20/20* (2019.01)
*H04L 12/24* (2006.01)

(58) Field of Classification Search
USPC .................................................. 370/241, 248
See application file for complete search history.

(56) References Cited

U.S. PATENT DOCUMENTS

| | | | |
|---|---|---|---|
| 2014/0133844 A1* | 5/2014 | Dahlfort | H04B 10/0771 |
| | | | 398/10 |
| 2015/0269048 A1 | 9/2015 | Marr et al. | |
| 2019/0044824 A1* | 2/2019 | Yadav | H04W 24/04 |
| 2019/0260483 A1* | 8/2019 | Dupuis | H04L 41/0816 |

* cited by examiner

DYNAMIC SUBSCRIBER NETWORK PHYSICAL IMPAIRMENT DETECTION TECHNIQUES

CROSS-REFERENCE TO RELATED APPLICATIONS

This application claims priority to U.S. Application Ser. No. 62/810,111, filed on Feb. 25, 2019, which is incorporated by reference in its entirety.

BACKGROUND

This specification generally relates to telecommunications subscriber networks.

Subscriber networks sometimes experience physical layer impairments that can result in service degradation, service interruption, poor quality of customer experience, among others. For example, a bad splice, e.g., a poor connection between one or more electrical wires in a copper network, can impair or sometimes prevent transmission of electrical signals along a line of a subscriber network. Other examples of physical impairments, such as conductors not having proper electrical contacts can appear and behave like a bad splice. The presence of physical impairments can make a telecommunications system unreliable. Additionally, depending on its location, the presence of a physical impairment on a line in vectored systems can have network impacts on other lines, such as lines that are dependent on signals transmitted along the line with physical impairments, which then impacts customer experience on these other lines.

SUMMARY

Physical impairments in a subscriber network can be challenging to locate and monitor. For example, a bad splice on a line within a copper network can be challenging to locate because they can vary over time, are impacted by variable environmental conditions, and may not be apparent from a visual inspection. Furthermore, in a vectored system, since ports are mathematically coupled, physical impairments on a given line may affect communications on other lines of the system, and a line experiencing service problems may not necessarily be the line that has the physical impairment.

As described herein, "per-tone data" refers to data corresponding to each of multiple different tones in the upstream or downstream ends of a DSL line. For instance, in systems that are capable of multi-channel transmission techniques (e.g., Discrete Multi-tone (DMT)), a "tone" can represent one sub-carrier, and DMT can use 256 tones to carry bits/data for ADSL and each tone can carry up to 15 bits. As one example of per-tone data, a per-tone signal-to-noise ratio (SNR) refers to the SNR associated with modulating tones at certain kilohertz ranges.

In DSL networks, per-tone data is highly dimensional, e.g., XLIN data is a 384×384×256 matrix, which makes it challenging to identify the presence of physical impairments. Additionally, techniques commonly used for analytical models, such as dual-ended line testing (DELT), to detect the presence and/or location of physical impairments causes service disruptions. Given that physical impairments are time-varying and can affect other lines, obtaining network data using a DELT that characterizes the physical impairments without creating service disruptions is often challenging.

To address these and other limitations, systems and techniques disclosed herein use machine learning techniques to dynamically detect physical impairments in lines of a subscriber network. Physical impairments can be detected by developing predictions based on primary per-tone data, such as XLIN, HLOG, SNR, QLN, as well as secondary information, such as modem retrain reasons, changes in loop lengths over time, among others. A machine learning model can be trained to make predictions using feature subset ensembles representing different network measurements. The model can use a form of stacked generalization that increases performance, allows inspectability, and does not require all of the primary and secondary data points to be present. Depending on how much of the considered data is fed to the model, the output probability can be scaled based on the learned importance of each piece of data. The use of the techniques described throughout this document enable the detection of physical impairments in lines of a subscriber network without having to take the subscriber network offline. The techniques can also be used to allow a computing system to perform self-healing processes to improve the repair and/or maintenance of access network resource devices.

In general, a method can use machine learning techniques to dynamically detect physical impairments in lines of a subscriber network. The method can include: obtaining, by a computing device, data for a line of a subscriber network that indicates a set of one or more scores, where each score included in the set of scores indicates a conditional likelihood that the line has a type of impairment with respect to a different feature subset ensemble; providing, by the computing device, the obtained data as input to a model that is trained to output, for each of different sets of feature subset ensembles, a confidence score representing an overall likelihood that a particular line has a physical impairment; receiving, by the computing device and from the model, data indicating a particular confidence score representing an overall likelihood that the line has the physical impairment; and providing, by the computing device, the particular confidence score for output.

These and other implementations can each, optionally, include one or more of the following features. For example, in some implementations, each feature subset ensemble specifies a type of network measurement that reflects a particular set of signal attributes.

In some implementations, the data for the line of the subscriber network can include per-tone data associated with the subscriber network.

In some implementations, the model is a perceptron that is trained to (i) identify a respective weight assigned to each of the network measurements specified in the feature subset ensembles, and (ii) compute the confidence score by combining the scores according to the identified weights.

In some implementations, the method further includes providing the obtained data as input to multiple estimator models that are each trained to a conditional likelihood with respect to a particular feature subset ensemble from among the different feature subset ensembles.

In some implementations, the multiple estimator models include a XLIN model, a SNR model, and a QLN model.

In some implementations, the subscriber network is a digital subscriber line (DSL) network.

In some implementations, the DSL network is configured to operate a protocol standard for local loops shorter than 500 meters.

In some implementations, the subscriber network is a passive optical network (PON).

In some implementations, the method further includes: determining, by the computing device, a location along the line of the subscriber network that is associated with the physical impairment; and providing, by the computing device, a report indicating the location for output to a service provider system associated with the subscriber network.

In some implementations, the method further includes determining, by the computing device, that the particular confidence score satisfies a predetermined threshold; and based on determining that the particular confidence score satisfies the predetermined threshold, providing, by the computing device, a report to a service provider system associated with the subscriber network, the report indicating that the line of the subscriber network is predicted to have the physical impairment.

In some implementations, the data for a line of a subscriber network indicates activity on the line of the subscriber network during a particular time period. Additionally, the particular confidence score indicates an overall likelihood that the line has the physical impairment during the particular time period.

While some aspects of this disclosure refer to computer-implemented software embodied on tangible media that processes and transforms data, some or all of the aspects may be computer-implemented methods or further included in respective systems or devices for performing the described functionality. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
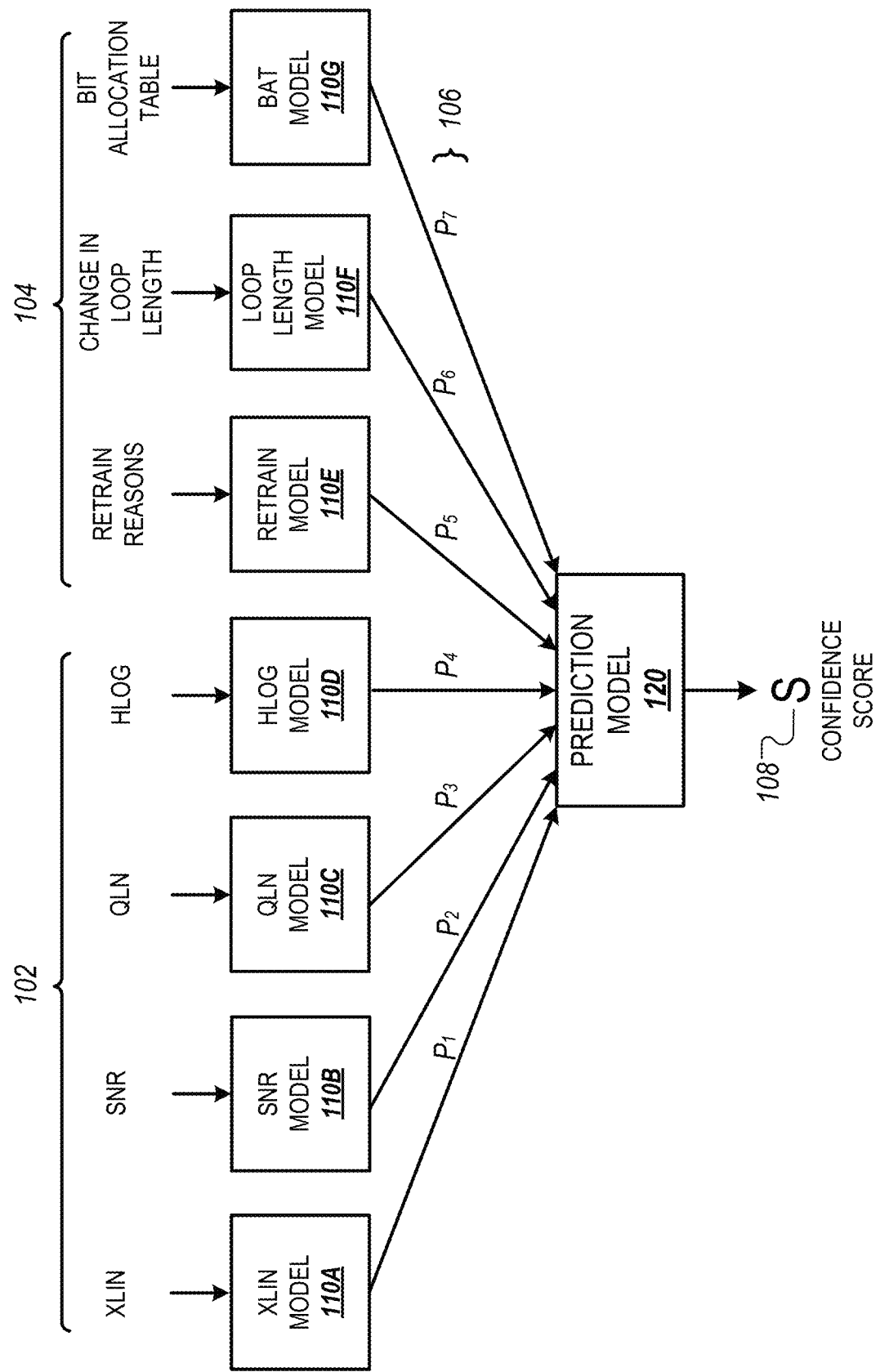
FIG. 1 is a diagram illustrating an example of a machine learning architecture for predicting a physical impairment on a line of a subscriber network.

This document describes methods, systems, and apparatus for predicting a physical impairment on a line of a subscriber network with minimal or no service disruptions. For example, a system can evaluate subsets of feature ensembles representing different network measurements to determine the likelihood that a physical impairment exists on the line. Physical impairments can be detected by developing predictions based on primary per-tone data, such as XLIN, HLOG, SNR, QLN, as well as secondary information, such as retrain reasons, changes in loop lengths over time, among others. The predictions can be performed by training an ensemble machine learning model (referred throughout as a "prediction model").

The prediction model disclosed herein can use a form of stacked generalization that increases performance, allows inspectability, and does not require all of the primary and secondary data points to be present. Depending on how much of the considered data is fed to the model, the output probability can be scaled based on the learned importance of each piece of data.

As described herein, a "subscriber network" refers to a telecommunications network that can be used to transmit digital data to customers. Examples of "subscriber networks" include a Digital Subscriber Line (DSL) network used to digital data over telephones or Passive Optical Network (PON) implementing point-to-multipoint architectures to provide fiber to end consumers. In some instances, the DSL network can be configured to implement a "G.fast" protocol standard for local loops shorter than 500 meters, with performance targets between 0.1 and 1 Gbit/s, depending on loop length. In such instances, high speed can be achieved over very short loops.

As described herein, "XLIN" refers to data representing availability of actual crosstalk coupling among pairs of a vectored system, in upstream and downstream directions. For example, in vectored DSL systems, XLIN can be reported through a management interface for diagnostics, troubleshooting, management, and planning.

As described herein, "SNR" refers to signal-to-noise ratio associated with signals transmitted over a subscriber network. The SNR of a network can be expressed as a ratio between signal strength and signal noise such that a higher SNR represents stronger signal quality. For example, SNR data can be used to indicate how modems have analyzed a line and determined SNR per tone. This data can change over time as line conditions change due to temperature variations or moisture in a cable.

As described herein, "QLN" refers to quiet line noise data gathered by modems when no signal is active on a line during initialization. QLN indicates noise levels in dBm/Hz over frequency) across applicable DSL spectrum in use. For example, QLN can be used to show noise spikes, which may be indications of high crosstalk.

As described herein, "HLOG" refers to data reported during a modem initialization phase and used to show attenuation over frequency. For example, a clean line HLOG should exhibit a plot where the slope of the attenuation curve typically declines slowly and evenly from lower frequencies to higher frequencies. Thus, increases in HLOG is a signature of a network problem. In some instances, HLOG data can be represented as a plot representing the relationship between transfer function magnitude (represented in decibels, dB) and tone frequency.

As described herein, "BAT" refers to a bit allocation table that specifies how many bits are used and/or can be used within a sub-carrier channel. The bit allocation table is maintained by modem routers of a subscriber network, and can be used for network diagnostics.

As described herein, a "loop length" refers to the length of a local loop of a subscriber network from a DSLAM located in a central office or remote terminal. The loop length is inversely correlated with maximum connection speed such that maximum DSL connection speed decreases as the loop length increases.

FIG. 1 is a diagram illustrating an example of machine learning architecture 100 for predicting a physical impairment on a line of a subscriber network. The architecture 100 includes multiple estimator models, such as a XLIN model 110A, a SNR model 110B, a QLN model 110C, a HLOG model 110D, a retrain model 110E, a loop length model 110F, and a BAT model 110G. The architecture 100 also includes a prediction model 120.

As shown in FIG. 1, estimator models 110A-D receive primary per-tone data 102 as input and estimator models 110E-G receive secondary per-tone data 104 as input. The estimator models 110A-G evaluate the respective input data to compute a set of scores 106 that are provided as input to the prediction model 120. The prediction model 120 evaluates the input data and outputs a confidence score 108 representing an overall likelihood that a physical impairment is detected on the line of the subscriber network.

The estimator models 110A-G can be level-0 estimators that are trained to evaluate a given feature subset ensemble of network data generated for the subscriber network. For example, the XLIN model 110A is trained to evaluate network data with respect to an XLIN feature subset ensemble and output a score representing a conditional probability that a physical impairment is detected on a line of a subscriber network given the evaluation of the network data with respect to the XLIN feature subset ensemble. In this respect, each of the estimator models 110A-G evaluate network data with respect to different feature subset ensembles and thereby compute conditional probabilities representing different types of likelihoods that a physical impairment exists based on unique evaluation criteria. Since network performance impacts resulting from physical impairments can be challenging to detect, using conditional probabilities can improve the predictive accuracy of physical impairment detection by considering multiple factors that are impacted by physical impairments (e.g., multiple feature subset ensembles).

The prediction model 120 can be a machine learning model that is trained to output, for different subsets of feature ensembles, a confidence score 108 representing an overall likelihood that a physical impairment is detected on a line of a subscriber network. In some instances, the prediction model 120 is any suitable neural network that employs multiple layers of operations to predict one or more outputs from one or more inputs.

The prediction model 120 can include an input layer that receives per-tone data as input. The per-tone data includes scores computed by the estimator models 110A-G representing conditional probabilities of a detected physical impairment given a specific feature subset ensemble, as discussed above. The prediction model 120 can also include one or more hidden layers situated between an input layer and an output layer. The output of each layer can be used as an input to another layer in the network, e.g., the next hidden layer or the output layer. Each layer of a prediction model 120 can specify one or more transformation operations to be performed on input to the layer. Some layers have operations that are referred to as neurons. Each neuron receives one or more inputs and generates an output that is received by another neural network layer. Often, each neuron receives inputs from other neurons, and each neuron provides an output to one or more other neurons.

The architecture of the prediction model 120 can specify what layers are included in the network and their properties, as well as how the neurons of each layer of the network are connected. In other words, the architecture specifies which layers provide their output as input to which other layers and how the output is provided. The transformation operations of each layer can be performed by computers having installed software modules that implement the transformation operations. Thus, a layer being described as performing operations means that the computers implementing the transformation operations of the layer perform the operations. Each layer generates one or more outputs using the current values of a set of parameters for the layer. Training the prediction model 120 can therefore involve continually performing a forward pass on the input, computing gradient values, and updating the current values for the set of parameters for each layer. Once the prediction model 120 is trained, the final set of parameters can be used to make predictions in a production system.

The prediction model 120 can be a simple neural network, such as a perceptron, that assigns weights to each of the inputs received from the estimator models 110A-G. This provides a simple way for the prediction model 120 to interpret the importance of each data point. In other implementations, the prediction model 120 is a multilayer perceptron that employs more challenging evaluation techniques but better captures tradeoffs. For example, if the XLIN model 110A predicts a physical impairment based on a XLIN feature subset ensemble, but the SNR model 110B does not predict a physical impairment based on a SNR feature subset ensemble, the prediction model 120 can independently evaluate the per-tone data to resolve the competing conditional probabilities. In doing so, the prediction model 120 can evaluate, for example, the reliability of each conditional probability, a precision level associated with the conditional probability, historical assessments of the estimator models, among other factors.

In some implementations, the prediction model 120 is a convolutional network. Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron. Convolutional neural network layers have one or more filters, which are defined by parameters of the layer. A convolutional neural network layer generates an output by performing a convolution of each neuron's filter with the layer's input. In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Generally, convolutional neural networks employ weight sharing so that all neurons in a depth sublayer have the same weights. This provides for translation invariance when detecting features in the input. Convolutional neural networks can also include fully-connected layers and other kinds of layers. Neurons in fully-connected layers receive input from each neuron in the previous neural network layer.

In some implementations, the prediction model 120 receives only a subset of the data output by the estimator models 110A-G. For example, in some instances, only XLIN and SNR feature ensembles are evaluated by the XLIN model 110A and the SNR model 110B, but QLN features ensembles are not evaluated by the QLN model 110C. In this example, where not all of the per-tone data is present, the QLN model 110C is bypassed and the conditional probability typically outputted by the QLN model 110C is set to a predetermined static value (e.g., 0.5). In this example, the prediction model 120 is allowed to assess tradeoffs among the remaining data points even with missing data.

The techniques of gathering data and making predictions discussed above can be performed with minimal or no impact on service associated with the subscriber network. In other words, the subscriber network can remain in showtime while the data is gathered, and the predictions made, such that the subscriber network can continue to provide service to subscribers while these techniques are carried out. As described herein, "showtime" refers to the state that is reached after an initialization procedure has been completed in which channel data is transmitted. Lines that are in showtime therefore represent lines that are in a state of post-initialization data transmission after the initialization procedure has been completed.

The prediction model 120 therefore provide improvements over other prediction techniques that often employ double ended line testing (DELT) or single ended line testing (SELT), which require the subscriber network to be taken offline (i.e., taken out of showtime). Additionally, in the case of very-high-bit-rate digital subscriber line (VDSL) networks, the prediction model 120 can be used to consider an entire vectoring system (i.e., that includes multiple lines), not just an individual line. Predictions and data from prediction model 120 can be aggregated over time, which allow a number of unique advantages. For example, the time-varying nature of physical impairments can be addressed by taking a window over a set of predictions rather than relying on a single prediction at a single time. As another example, cause and effect behavior can be addressed through successive operations. For instance, if no physical impairment was initially observed, a later observation that the noise floor on other lines subsequently rose can be used to modify the initial prediction that a physical impairment was actually observed.

Figure 2A:
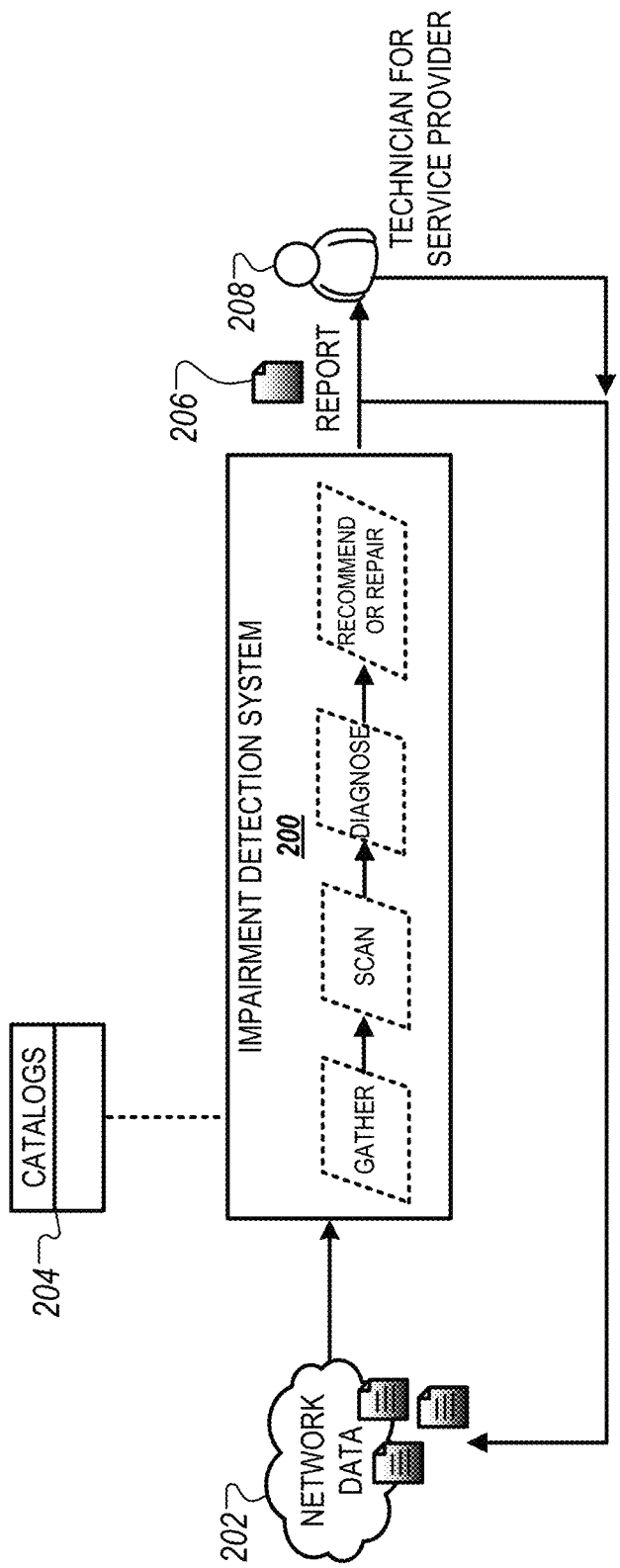
FIG. 2A illustrates an example of a self-healing repair process performed by the impairment detection system.
Figure 2B:
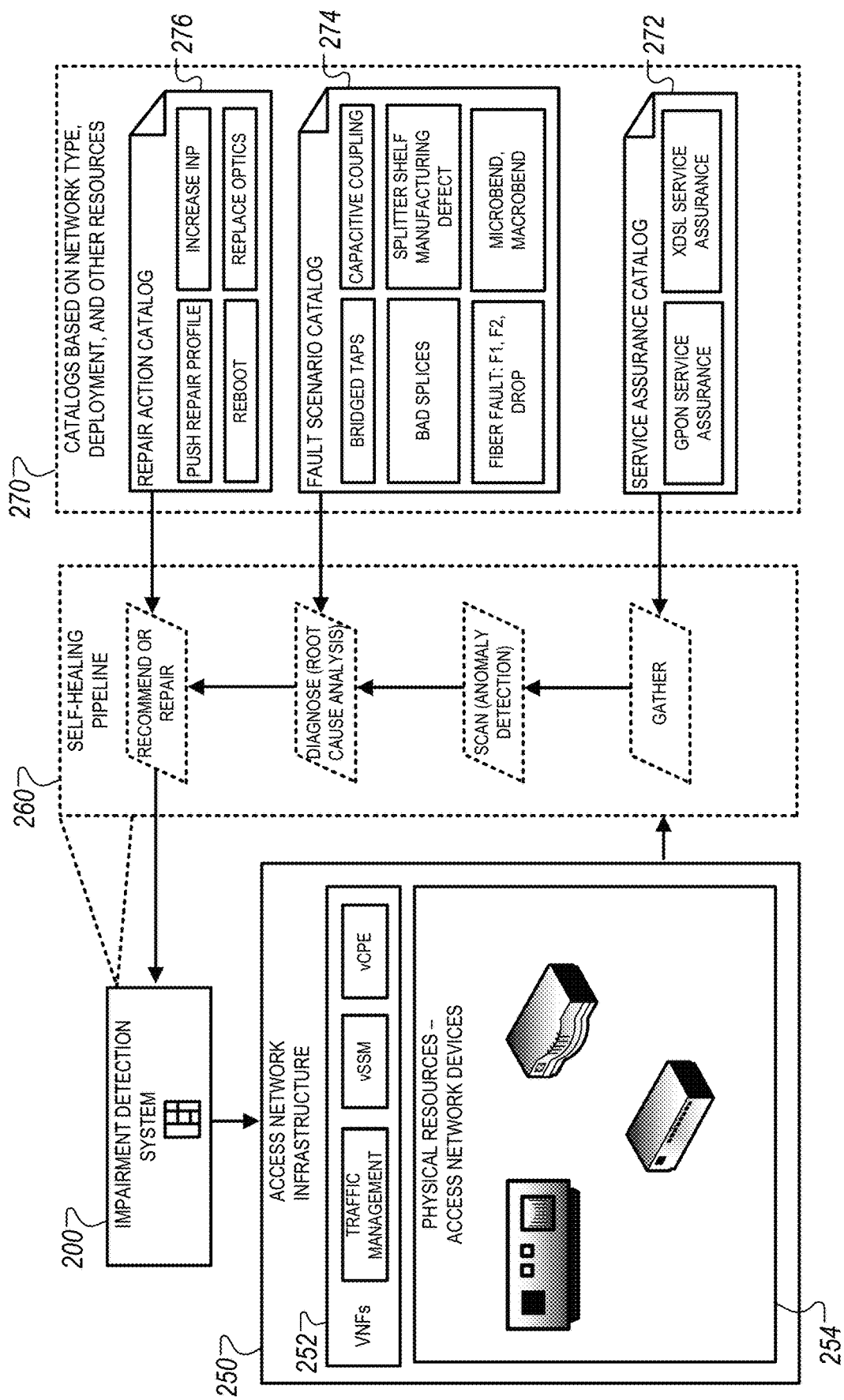
FIG. 2B illustrates examples of catalogs that can be used by the impairment detection system during the self-healing repair process.

FIGS. 2A-2B are diagrams illustrating an example of an impairment detection system 200 that uses predicted physical impairments to repair components of a subscriber network. Referring initially to FIG. 2A, an example of a self-healing repair process is depicted. The self-healing repair process can be used by the system 200 to repair components of a subscriber network based on predicting the detection of physical impairments on lines of the subscriber network.

The system 200 can be deployed by a service provider that is associated with (e.g., that provides, operates, and/or maintains) a subscriber network. For example, the system 200 can be implemented on one or more computing devices of a facilities-based service provider that manages service provided to customers over the subscriber network, e.g., a member organization listed on the Cellular Telecommuting & Internet Association (CTIA). In other examples, the system 200 can be implemented on one or more computing devices of a third-party provider that is contracted by a facilities-based service provider to manage service interruptions and/or other performance-related impacts associated with the subscriber network.

As shown in FIG. 2A, the system 200 evaluates network data 202 collected for the subscriber network using a set of monitoring catalogs 204. The network data 202 can include primary per-tone data, such as XLIN, HLOG, SNR, QLN, as well as secondary information such as retrain reasons, changes in loop length over time, or a bit allocation table. The monitoring catalogs 204 specify triggers and conditions associated with the subscriber network, such as service assurance or fault scenarios, and repair actions to be performed in response to satisfaction of certain triggers and conditions. Examples of monitoring catalogs 204 are depicted in FIG. 2B and discussed in detail below.

In a typical self-healing process, the system 200 performs operations that include, but are not limited to, gathering data, scanning data, diagnosing data, and performing a repair action (or providing a recommendation). Specifically, the system 200 gathers the network data 202. The system 200 scans for conditions and/or triggers specified by the monitoring catalogs 204 by, for instance, applying the estimator models 110A-G to evaluate the gathered network data with respect to different feature subset ensembles.

The system 200 then diagnoses the gathered network data based on the evaluation. The diagnosis can include determining the likelihood that one or more physical impairments are on lines of the subscriber network, locations of physical impairments along the lines, identified network conditions that might be resulting in performance degradation, among others.

The system 200 prepares a report 206 that includes the diagnoses for the subscriber network and/or recommended repair actions that can be performed to address the diagnoses. The report 206 can be provided to technician 208 of a service provider that manages the subscriber network. For example, the report 206 can identify a predicted location of detected physical impairment along a line of the subscriber network, e.g., a distance from a Digital Subscriber Line Access Multiplexer (DSLAM) in a copper network. As another example, the report 206 can identify a type of physical impairment that is detected on the line, e.g., a bad splice. In some instances, the report 206 includes relevant network information that can be used by the technician 208 for additional diagnosis or identify the cause of the physical impairment. For example, the report 206 can include a monitored temperature, a monitored humidity, or prior detected physical impairments in nearby locations. This information can be used in conjunction with the location of the impairment (e.g., feet from the access device) by the technician 208 to identify a root cause of the physical impairment or determine whether the physical impairment may be caused by a larger problem with the line or other associated lines in a vectored system.

Once the report 206 has been provided to the technician 208, the system 200 can monitor repair or maintenance actions performed on the line to map actions to diagnoses. This information can be used to retrain the estimator models 110A-G and/or the prediction model 120 or adjust subsequent prediction techniques. For example, the system 200 can use the performed actions to determine whether an automated diagnosis was correct, and in response, use this determination to augment predictions performed at a later time point at the same location. As another example, if the actions performed indicate that the prediction was incorrect (i.e., the technician provides confirmation that no physical impairment was found at the predicted location), then the system 200 can use this information as a feedback mechanism to re-train and/or re-calibrate the estimator models 110A-G or the prediction model 120 to reduce the likelihood of subsequent false-positive predictions. In this way, a feedback loop is created that enables the prediction model to continue to learn which actions to recommend when certain predictions are made, and to more accurately make predictions.

Referring now to FIG. 2B, examples of catalogs used by the system 200 during the self-healing repair process are depicted. In this example, the system 200 performs a self-healing process 260 similar to the self-healing process discussed above in reference to FIG. 2A. Specifically, the system 200 uses a set of catalogs 270 to predict physical impairments that are detected in the network infrastructure 220.

In the example depicted in FIG. 2B, the system 200 monitors and evaluates network data collected by the access network infrastructure 250 for performance degradation due to physical impairments. The access network infrastructure 250 includes virtual network functions (VNFs) 252 that are used for managing performance issues associated with physical resources 254. The VNFs can include traffic management modules, a virtual subscriber session manager (vSSM), and virtual customer premises equipment (vCPE). As described herein, a "module" can refer to software and/or a combination of software and hardware (e.g., one or more processors). The VNFs 252 can include software that is used to deliver managed services, such as managing network deployments, or configuring on-premises hardware. The physical resources 254 include access network devices associated with the subscriber network, such as routers, modems, power supplies, network access devices, among others.

As shown in FIG. 2B, the system 200 initially gathers data network collected by physical resources 254. The system 200 obtains a service assurance catalog 272, which provides a set of tests to be performed to determine whether service over the subscriber network meets certain specifications. In the example depicted in FIG. 2B, the service assurance catalog 272 includes service assurance specifications for a PON and a DSL. The system 200 selects the appropriate service assurance specification depending on the type of subscriber network operated by the physical resources 254. Each of the specifications can identify, for example, network performance, customer complaints, fault tolerances, workflow management, among other types of information related to network Quality-of-Service (QoS).

The system 200 scans the gathered data using a fault scenario catalog 274 to diagnose any network performance issues detected for the physical resources 254 using, for instance, root cause analysis. The fault scenario catalog 274 includes examples of physical impairments that are likely to cause performance degradation, such as bridged taps, bad splices, fiber faults, capacitive coupling, splitter shelf manufacturing defects, or microbends/macrobends. As discussed throughout, the system 200 predicts whether one or more of the physical impairments specified by the fault scenario catalog have been detected on the lines of the subscriber network based on evaluating different feature subset ensembles in the gathered data.

If the system 200 predicts that one or more physical impairments have been detected on the lines of the subscriber network, the system 200 then accesses a repair action catalog 276 to identify the appropriate action to be performed. The repair action catalog 276 specifies maintenance or repair actions that can be performed to address the detected physical impairments. In some examples, a repair action includes automated actions that can be executed without intervention by a technician 208, such as rebooting network components or adjusting network traffic parameters. In other examples, a repair action includes recommendations provided to a technician 208 to perform additional diagnosis and/or maintenance, displaying a repair profile, providing a list of replacement options for certain network components that are likely to be malfunctioning, or increasing the INP.

The system 200 generates a report that includes repair actions that are identified as being relevant to the diagnoses of the subscriber network as discussed above in reference to FIG. 2A. In some instances, where automated repair actions are selected from the repair action catalog 276, the system 200 may automatically execute a repair action. Alternatively, where the system 200 determines that additional intervention may be needed, the system 200 generates a report that includes pertinent information and provides the report for output to a service provider system.

Figure 3:
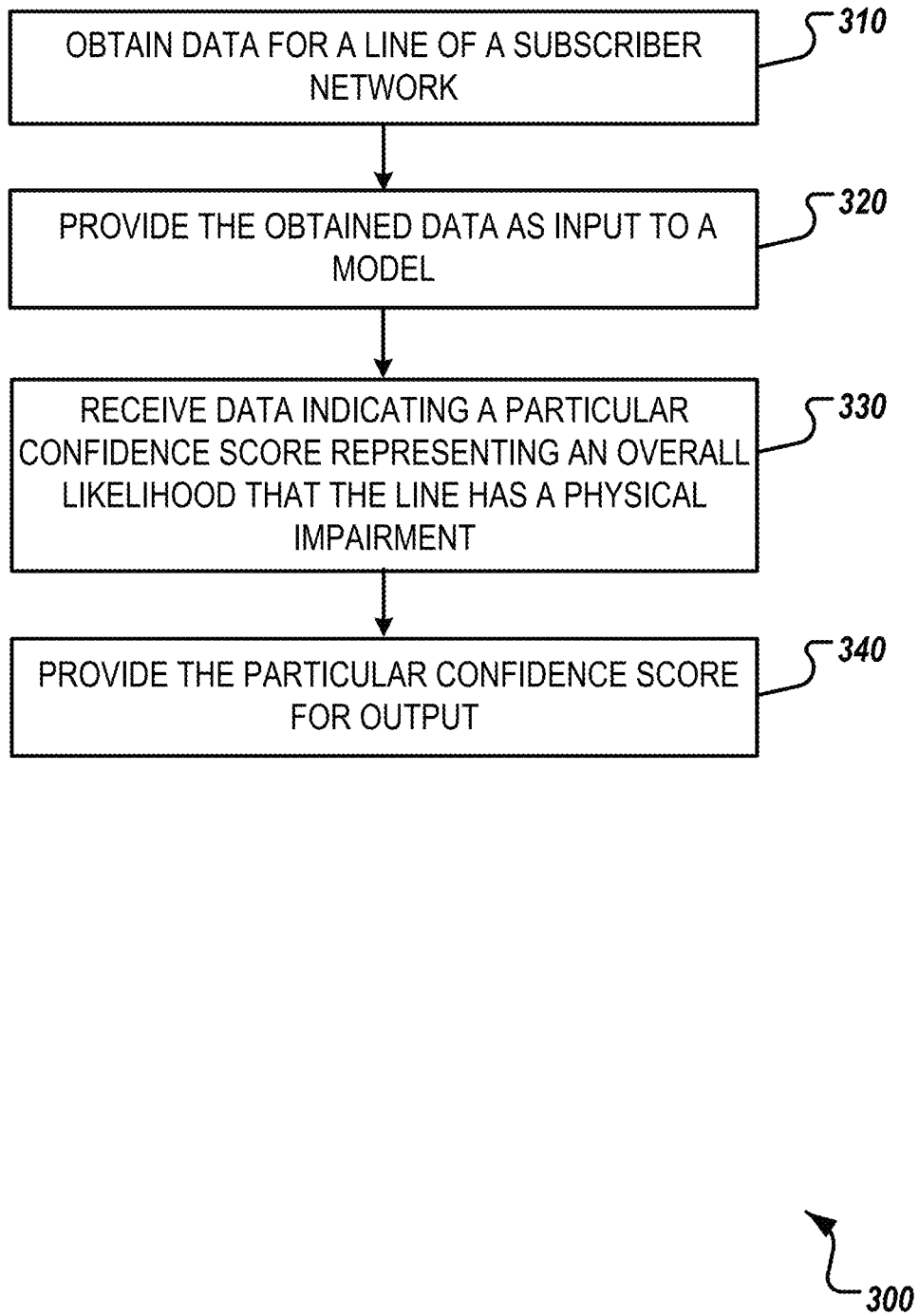
FIG. 3 is a flow chart of an example of a process for predicting the likelihood that a line of a subscriber network has a physical impairment.

FIG. 3 is a diagram illustrating an example of self-healing process for generating repair reports based on monitoring network data generated by a subscriber network. At 310, data for a line of a subscriber network is obtained. The data can indicate a set of one or more scores. The scores indicate a conditional likelihood that the line has a type of impairment with respect to a different feature ensemble. For instance, as depicted in FIG. 1, the set of one or more scores can be computed by the estimator models 110A-G based on evaluating a different type of network measurement associated with the subscriber network. As shown in FIG. 1, the estimator models can include a XLIN model 110A, a SNR model 110B, a QLN model 110C, a HLOG model 110D, which are trained to evaluate primary per-tone data 102 of the subscriber network. The estimator models also include other models, such as a retrain model 110E, a loop length model 110F, and a BAT model 110G, which are trained to evaluate secondary data 104.

As an example, the XLIN model 110A receives network data of the subscriber network as input and evaluates the data using an XLIN feature subset ensemble. The XLIN model 110A generates a score representing a conditional probability $P_1$ reflecting the likelihood of a physical impairment given only the information included in the XLIN feature subset ensemble. As another example, the SNR model 110B receives network data of the subscriber network as input and evaluates the data using an SNR feature subset ensemble. The SNR model 110B generates a score representing a conditional probability $P_1$ reflecting the likelihood of a physical impairment given only the information included in the SNR feature subset ensemble. As discussed above, each score included in the set of scores 106 represents conditional probabilities in that it reflects a prediction of physical impairment for a specific type of network measurement (e.g., XLIN, SNR, QLN, HLOG).

In some implementations, the prediction model 120 is a perceptron. The prediction model 120, in such implementations, can be trained to identify a respective weight assigned to each of the network measurements specified in the feature subset ensembles. For example, the prediction model 120 can identify different weights to each of the outputs of the estimator models 110A-G based on their relative importance to the detection of a physical impairment along the line of the subscriber network. The prediction model 120 computes the confidence score 108 as a single score by combining the scores according to the identified weights. For example, the prediction model 120 can combine scores by multiplying each score by its assigned weight and summing the scores together to compute the confidence 108. As another example, the prediction model 120 can normalize the confidence score between a minimum value and a maximum value (e.g., between 0.0 and 1.0) to represent the probability of a physical impediment being detected on a line.

At 320, the obtained data indicating the set of one or more scores is provided as input to the prediction model 120. The prediction model 120 is trained to output, for each of different sets of feature ensembles, a confidence score representing an overall likelihood that a particular line has a physical impairment. As discussed above, in some implementations, the prediction model 120 is a perceptron that assigns weights to each of the scores included in the obtained data and computes the confidence score based on combining the scores according to the assigned weights. In such implementations, the assigned weight can represent the importance of each data point that can be based on, for instance, the accuracy of the information represented by the data point, the predictive strength of data point, the frequency of data collection, among others. For example, if the prediction model 120 determines that the XLIN data has greater importance to physical impairment prediction relative to the QLN data, then the score representing conditional probability $P_1$ is assigned a higher weight compared to the weight assigned to the score representing conditional probability $P_3$.

At 330, data indicating a particular confidence score representing an overall likelihood that the line of the subscriber network has the physical impairment is received. For example, data indicating the confidence score 108 is received from the prediction model 120 responsive to the input provided in step 420. As discussed above, the value of the confidence score 108 can represent an overall likelihood that the line has a physical impairment.

At 340, the particular confidence score is provided for output. For example, the confidence score 108 is provided for output in a repair report to a service provider associated with the subscriber network. As depicted in FIG. 2A, the confidence score 108 can be included in a report 206 that is provided to a technician 208. The report 206 can identify a predicted location of the physical impairment along the line of subscriber network, the probability associated with the existence of the physical impairment, and any relevant network data 202 that may be useful to the technician 208 for repairing the predicted physical impairment and/or performing a maintenance operation to identify the cause of the physical impairment.

In some implementations, the process 300 includes additional operations. For example, where a physical impairment has been detected on the line of the subscriber network, the process 300 can also include determining a location of the physical impairment along the line of subscriber network. For example, the distance can be represented as a distance from a Digital Subscriber Line Access Multiplexer (DSLAM) in a copper network. In such implementations, a report indicating the location of the physical impairment can be provided to a service provider system associated with the subscriber network. For example, as illustrated in FIG. 2A, the system 200 can provide a report 206 to the technician 208 of a service provider of the subscriber network.

In some implementations, the process 300 includes comparing a value of the confidence score 308 to a predetermined threshold. The predetermined threshold can be specified by a service provider and used to adjust the sensitivity by which the system determines whether the impairment detection system determines that a physical impairment is likely to be on a line of the subscriber network. For example, the system can detect a physical impairment on the line of the subscriber network if the value of the confidence score 108 exceeds the predetermined threshold. Alternatively, the system can determine that no physical impairment has been detected on the line if the value of the confidence score 108 does not exceed the predetermined threshold.

In some implementations, the data evaluated by the prediction model 120 indicates activity on the line of the subscriber network during a particular time period. In such implementations, the confidence score 108 indicates an overall likelihood that the line has the physical impairment during the particular time period. In this respect, the system can evaluate network data periodically (i.e., over specified time periods) to determine whether a detected physical impairment persists over time, or may be a false positive detection due to anomalous activity over the subscriber network. For example, the system can initially perform a network performance check during a first time point to determine whether a physical impairment has been detected, and then repeat the network performance check at a second, later time point. In this example, the network performance test conducted at the first time point may indicate a low likelihood of a physical impairment but the network performance test conducted at the second time point may indicate a high likelihood of a physical impairment. The system, in this example, can collect network performance data at multiple time points between the first and second time points so that the confidence score 108 can be based on multiple observation points between the first and second time points.

While this specification contains many specific implementation details, these should not be construed as limitations on the scope of any inventions or of what may be claimed, but rather as descriptions of features specific to particular implementations of particular inventions. Certain features that are described in this specification, in the context of separate implementations, can also be implemented in combination or in a single embodiment. Conversely, various features that are described in the context of a single embodiment can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
providing input to multiple estimator models that are each trained to output a conditional likelihood with respect to a particular feature subset ensemble from among different feature subset ensembles;
obtaining, by a computing device, data for a line of a subscriber network that indicates a set of one or more scores, wherein each score included in the set of scores indicates the conditional likelihood that the line has a type of impairment with respect to a different feature subset ensemble;
providing, by the computing device, the obtained data as input to a prediction model that is trained to output, for each of different sets of feature subset ensembles, a confidence score representing an overall likelihood that a particular line has a physical impairment;
receiving, by the computing device and from the prediction model, data indicating a particular confidence score representing an overall likelihood that the line has the physical impairment; and
providing, by the computing device, the particular confidence score for output.

2. The method of claim 1, wherein each feature subset ensemble specifies a type of network measurement that reflects a particular set of signal attributes.

3. The method of claim 2, the prediction model is a perceptron that is trained to (i) identify a respective weight assigned to each of the network measurements specified in the feature subset ensembles, and (ii) compute the confidence score by combining the scores according to the identified weights.

4. The method of claim 1, wherein the multiple estimator models include a signal to noise ratio (SNR) model, and a quiet line noise (QLN) model.

5. The method of claim 1, wherein the subscriber network is a digital subscriber line (DSL) network.

6. The method of claim 1, wherein the subscriber network is a passive optical network (PON).

7. A method, comprising:
obtaining, by a computing device, data for a line of a subscriber network that indicates a set of one or more scores, wherein each score included in the set of scores indicates a conditional likelihood that the line has a type of impairment with respect to different feature subset ensembles;
providing, by the computing device, the obtained data as input to a model that is trained to output, for each of different sets of feature subset ensembles, a confidence score representing an overall likelihood that a particular line has a physical impairment;
receiving, by the computing device and from the model, data indicating a particular confidence score representing an overall likelihood that the line has the physical impairment;
determining, by the computing device, a location along the line of the subscriber network that is associated with the physical impairment; and
providing, by the computing device, a report indicating the location for output to a service provider system associated with the subscriber network.

8. A method, comprising:
obtaining, by a computing device, data for a line of a subscriber network that indicates a set of one or more scores, wherein each score included in the set of scores indicates a conditional likelihood that the line has a type of impairment with respect to different feature subset ensembles;
providing, by the computing device, the obtained data as input to a model that is trained to output, for each of different sets of feature subset ensembles, a confidence score representing an overall likelihood that a particular line has a physical impairment;
receiving, by the computing device and from the model, data indicating a particular confidence score representing an overall likelihood that the line has the physical impairment;
determining, by the computing device, that the particular confidence score satisfies a predetermined threshold; and
based on determining that the particular confidence score satisfies the predetermined threshold, providing, by the computing device, a report to a service provider system associated with the subscriber network, the report indicating that the line of the subscriber network is predicted to have the physical impairment.

9. A method, comprising:
obtaining, by a computing device, data for a line of a subscriber network that indicates a set of one or more scores, wherein each score included in the set of scores indicates a conditional likelihood that the line has a type of impairment with respect to different feature subset ensembles;
providing, by the computing device, the obtained data as input to a model that is trained to output, for each of different sets of feature subset ensembles, a confidence score representing an overall likelihood that a particular line has a physical impairment;
receiving, by the computing device and from the model, data indicating a particular confidence score representing an overall likelihood that the line has the physical impairment; and
providing, by the computing device, the particular confidence score for output, wherein:
the obtained data for a line of a subscriber network indicates activity on the line of the subscriber network during a particular time period; and
the particular confidence score indicates an overall likelihood that the line has the physical impairment during the particular time period.

10. A system comprising:
one or more computers; and
one or more storage devices storing instructions that, when executed by the one or more computers, cause the one or more computers to perform operations comprising:
providing input to multiple estimator models that are each trained to output a conditional likelihood with respect to a particular feature subset ensemble from among different feature subset ensembles;
obtaining, by a computing device, data for a line of a subscriber network that indicates a set of one or more scores, wherein each score included in the set of scores indicates the conditional likelihood that the line has a type of impairment with respect to a different feature subset ensemble;
providing, by the computing device, the obtained data as input to a prediction model that is trained to output, for each of different sets of feature subset ensembles, a confidence score representing an overall likelihood that a particular line has a physical impairment;
receiving, by the computing device and from the prediction model, data indicating a particular confidence score representing an overall likelihood that the line has the physical impairment; and
providing, by the computing device, the particular confidence score for output.

11. The system of claim 10, wherein each feature subset ensemble specifies a type of network measurement that reflects a particular set of signal attributes.

12. The system of claim 11, the prediction model is a perceptron that is trained to (i) identify a respective weight assigned to each of the network measurements specified in the feature subset ensembles, and (ii) compute the confidence score by combining the scores according to the identified weights.

13. A non-transitory computer-readable storage device encoded with computer program instructions that, when executed by one or more computers, cause the one or more computers to perform operations comprising:
providing input to multiple estimator models that are each trained to output a conditional likelihood with respect to a particular feature subset ensemble from among different feature subset ensembles;
obtaining, by a computing device, data for a line of a subscriber network that indicates a set of one or more scores, wherein each score included in the set of scores indicates the conditional likelihood that the line has a type of impairment with respect to a different feature subset ensemble;
providing, by the computing device, the obtained data as input to a prediction model that is trained to output, for each of different sets of feature subset ensembles, a confidence score representing an overall likelihood that a particular line has a physical impairment;

receiving, by the computing device and from the prediction model, data indicating a particular confidence score representing an overall likelihood that the line has the physical impairment; and providing, by the computing device, the particular confidence score for output.

14. The device of claim 13, wherein each feature subset ensemble specifies a type of network measurement that reflects a particular set of signal attributes.

15. The device of claim 14, the prediction model is a perceptron that is trained to (i) identify a respective weight assigned to each of the network measurements specified in the feature subset ensembles, and (ii) compute the confidence score by combining the scores according to the identified weights.

16. The device of claim 13, wherein the multiple estimator models include a signal to noise ratio (SNR) model, and a quiet line noise (QLN) model.

17. The device of claim 13, wherein the subscriber network is a digital subscriber line (DSL) network.

* * * * *